Patented Jan. 22, 1952

2,583,045

UNITED STATES PATENT OFFICE 2,583,045

METHOD OF THERMOCHEMICALLY CUTTING FERROUS METAL

Harold R. Fisher, Metuchen, N. J., assignor to Air Reduction Company, Incorporated, New York, N. Y., a corporation of New York No Drawing. Application April 2, 1951, Serial No. 218,900

7 Claims. (Cl. 148—9)

This invention relates to the oxygen-cutting of ferrous metals and alloys which resist or are immune to the ordinary thermochemical cutting techniques. Examples of such cut-resistant ferrous metals and alloys are stainless steel and other alloy steels containing a large percentage of chromium, or chromium and nickel.

Stainless steel, and other alloy steels containing a large percentage of chromium, are difficult to cut thermochemically with an oxygen-cutting torch because the chromic oxides formed during the cutting operation are very refractory and do not melt and flow away as molten slag but remain in the kerf and interfere with the cutting operation.

The principal object of this invention is to provide an improved thermochemical cutting flux and flux cutting method which makes possible the cutting of cut-resistant metals including stainless steel and other alloy steels containing a large percentage of chromium, or nickel and chromium, in a rapid, efficient and economical way.

I have found that an alloy steel containing an amount of chromium which would ordinarily make thermochemical cutting of the alloy steel difficult or impossible, can be satisfactorily cut by the use of a flux in the cutting-oxygen stream comprising an inorganic salt containing sodium and sulphur, such as sodium sulphite ($Na_2SO_3$), sodium sulphate ($Na_2SO_4$), sodium bisulphate ($NaHSO_4$), or sodium thiosulphate ($Na_2S_2O_3$), or a combination of two or more of such materials.

According to the invention, one of the above-mentioned materials, or a combination of them, in powdered form, is introduced into the cutting-oxygen stream at any convenient place so long as it will be present with the cutting-oxygen in the kerf or at the zone where the thermochemical action is taking place. It might even be projected as a separate stream into the kerf so that it is introduced into the cutting-oxygen stream at the zone where the thermochemical action is occurring, but preferably it is introduced into the cutting-oxygen stream before the cutting-oxygen reaches the cutting torch.

Any suitable apparatus may be used for introducing the powdered flux uniformly and at the desired rate into the cutting-oxygen stream, such as that disclosed in the application of Joseph M. Tyrner, Serial No. 696,258, filed September 11, 1946, now Patent No. 2,549,033, issued April 17, 1951 and assigned to the assignee of the present application. The apparatus in that application comprises an electrically vibrated feed hopper for the powdered flux to be introduced into the oxygen stream, a gas-tight casing in which the feed hopper is located and having inlet and outlet connections by which the casing can be inserted in the cutting-oxygen line leading to the cutting-torch, and an electrically vibrated chute within the casing for receiving the powdered flux vibrated out of the hopper and for conducting it to a position where it is sifted into the cutting-oxygen as it leaves the casing through the outlet.

The cutting-oxygen stream containing the powdered flux is projected by the cutting-torch against the high chromium content alloy steel while the metal is at kindling temperature and the cutting is effected thermochemically by the combined action of the cutting-oxygen stream and the powdered flux. The heating of the metal to its kindling temperature may be effected by the usual preheating flames of the cutting-torch, or in any other suitable way.

The manner in which the kind of flux material contemplated by the invention acts to facilitate the cutting of ferrous metals and alloys having a high chromium or chromium-nickel content can be explained, it is believed, on the basis of the sodium and sulphur constituents. It is thought that the sulphur-containing anion of the flux attacks the iron and/or nickel of the metal or alloy, dissolving them as complex sulphur compounds in the molten slag. At the same time, the alkaline sodium ion reacts with or dissolves the chromium to form chromates or chromites which are also carried away in the slag. The state of oxidation of the sulphur compounds in the slag is highest on the surface adjacent to the oxygen stream, and lowest next to the metal, the reducing action of which utilizes some of the oxygen combined with the sulphur. Thus sulphur is acting as an oxygen carrier as well as a slag-forming material. The reactions caused by the sulphur-containing anion and the sodium ion prevent the formation of a film of refractory chromic oxide which hinders the cutting of stainless steel. Formation of such film is prevented even with steels having a chromium or nickel and chromium content so high that fluxes which do not contain sulphur are ineffective for cutting. The melting point of chromic oxide ($Cr_2O_3$) is 1990° C., while the melting point of sodium chromate ($Na_2CRO_4$) is 392° C., according to Lange's Handbook of Chemistry. The low-melting chromates are easily removed from the kerf by the cutting-oxygen jet during the cutting operation to permit rapid and efficient cutting.

The fluxes of the present invention, containing sodium and sulphur, are more effective than metal powders which burn exothermically to increase the temperature in the kerf and serve as diluents and solvents for the refractory materials. They are also more effective than alkaline fluxes, such as sodium bicarbonate, which attack only the chromium and which are not effective when the chromium content is very high, or when sufficient nickel is present to increase the resistance of the work to alkaline attack.

Of the flux materials mentioned, sodium sulphite has been found to produce the most satisfactory results, especially when cutting cast steels containing a large percentage of chromium. Sodium sulphite is therefore the preferred fluxing agent. No difficulty is encountered in feeding it into the cutting-oxygen stream or through the cutting-torch, and when it is used, only slight preheating of the workpiece is needed to start a cut, and the thermochemical reaction passes through the metal very quickly. The cut is easily maintained, but if lost it can be regained easily. The slag produced has a low-melting point, and as the material cools, the slag detaches itself readily from the workpiece. Moreover, only a very small drag occurs during the cutting when a sodium sulphite flux is used in the cutting-oxygen stream and a smoother cut face is produced. Little or no static electricity builds up in the gas passage.

Sodium sulphite has been found to have fluxing qualities superior to other known fluxes when introduced into the cutting-oxygen stream during the cutting of both wrought and cast alloy steels containing a large percentage of chromium, and when tested against known fluxes, such as iron powder and sodium bicarbonate, in the thermochemical cutting of cast alloy steels having a high chromium content, was found to be the only one of these fluxes tested that eliminated the difficulties present in the cutting of this kind of alloy steel.

I have found that sodium sulphite is very successful in cutting austenitic Cr-Ni stainless steels—alloy steels that contain principally chromium, iron and nickel. In addition to the large amount of chromium which resists cutting, the austenitic steels contain nickel which increases the resistance of steel to any alkaline attack and to any chemical corrosion. The nickel forms a tenacious oxide film on the steel surface, which film is generally resistant to attack by alkaline materials. However, with sodium sulphite the sulphur constituent attacks nickel readily, while the sodium forms sodium chromates which have low-melting points and therefore flow easily as explained hereinbefore, especially under the action of the cutting-oxygen jet. Sulphur not only attacks iron and nickel, but also aids in moving mechanically any oxides of chromium up to the exposed surface where they are attacked by sodium. Sodium also acts as a flux on chromium itself. Further, the abrasive action of the flowing stream of sodium sulphite helps to move the products of chemical reaction.

Extensive experiments have shown that a surprisingly small amount of sodium sulphite flux is required for cutting workpieces of various thicknesses. In cutting practices with adjuvant metallic powders, for example, one pound of powder is used for from 15 to 100 cubic feet of oxygen. With sodium sulphite, however, satisfactory results have been obtained with as little as one pound of such flux for as high as 800 cubic feet of oxygen. And a still smaller ratio of flux to oxygen will cut properly if the feeding apparatus is designed to feed the flux satisfactorily. Good results have been obtained using commercially available conventional feeders with one pound of sulphite flux for every 25 to 800 cubic feet of oxygen; for preferred commercial practice, one pound of flux for every 100 to 450 cubic feet of oxygen is recommended. The latter range permits optimum results with ordinarily available equipment. When comparing sodium sulphite to iron powder, for example, the amount of flux required is reduced from 200% to at least 800%. This enables a material reduction in total cost which is obtained without lessening the efficiency or speed of the cutting operation.

The minimum sodium sulphite flux feeds, including the one pound of flux for 800 cubic feet of oxygen, was used successfully for the cutting of even relatively difficult-to-cut stainless steels, such as Type 303 and Type 347. The former steel includes a 17-19% chromium and 8-10% nickel content, and the latter includes a 17-19% chromium and 8-12% nickel content.

In cutting stainless steel workpieces of different compositions and of ½-inch to 10-inch thicknesses, the preferred sodium sulphite feed ranges from 0.4 to 2.75 pounds per hour, while conventional practices with other metallic powder fluxes, such as iron powder, call for a range of 15 to 30 pounds per hour. The following results were obtained in cutting various stainless steel compositions with sodium sulphite fed into a cutting-oxygen stream with the apparatus disclosed in the said Tyrner application:

| Chromium | Nickel | Thickness of Workpiece | Flux Rate of Feed | Cutting Oxygen Rate of Feed | Oxygen-Flux Ratio |
|---|---|---|---|---|---|
| Per Cent | Per Cent | Inches | Lbs./hr. | Cft./hr. | Cft./lb. |
| 24-26 | 19-22 | ½ | 1.5 | 100 | 66.7 |
| 22-24 | 12-15 | ½ | 4.1 | 110 | 26.8 |
| 24-26 | 19-22 | ½ | 4.1 | 110 | 26.8 |
| 14-16 | 33-36 | ½ | 4.1 | 110 | 26.8 |
| 17-19 | 8-10 | 2 | 1.5 | 175 | 116.7 |
| 22-24 | 12-15 | 3 | 1.5 | 310 | 206.7 |
| 17-19 | 8-12 | 8 | 1.5 | 620 | 413.3 |
| 17-19 | 8-12 | 8 | 1.9 | 750 | 394.7 |
| 18-20 | 8-10 | 10 | 1.0 | 650 | 650.0 |
| 18-20 | 8-10 | 11 | 1.0 | 650 | 650.0 |

The sodium sulphite flux is screened to eliminate coarse particles. For commercial use, I have found it preferable to use powdered flux all of which passes through a 40 mesh sieve (0.0165 in. openings) and not more than 10% by weight passes through a 100 mesh sieve (0.0059 in. openings). If any coarser particles are used, the flux has a tendency to clog or cake in the apparatus; and if the particles are finer, the flux does not need feed properly.

Sodium sulphate, sodium bisulphate, and sodium thiosulphate also can be used according to the invention in cutting alloy steels having a high chromium content. The apparent theory of cutting with sodium sulphate, sodium bisulphate, and sodium thiosulphate is believed to be the same as that for sodium sulphite, as explained hereinbefore. All four fluxes are inorganic salts containing sodium and sulphur, and would therefore be expected to act in a similar manner. However, the feeding characteristics of such materials are not as good as those of sodium sulphite, for the former fluxes have a tendency to solidify or clog in the apparatus.

While particularly useful for cutting steels containing relatively large amounts of chromium, or chromium and nickel, the sodium-sulphur fluxes of this invention are also useful for cutting other metals. For instance, in the case of cast iron, the relatively high carbon content does not oxidize as readily as iron, and thus forms a protective covering over the metal. I have found that sodium sulphite, however, greatly accelerates the cutting action of the oxygen stream on cast iron, probably because the sulphite attacks the iron underneath the carbon layer, thereby loosening the carbon and sweeping it out with the slag.

This application is a continuation-in-part of my co-pending application Serial No. 90,548, filed April 29, 1949, now abandoned.

I claim:

1. The method of thermochemically cutting alloy steel containing a percentage of chromium which renders said steel difficult to cut thermochemically, which comprises projecting a stream of cutting-oxygen against the alloy steel to be cut while the metal is at kindling temperature and introducing into the cutting-oxygen stream a flux in powdered form consisting essentially of at least one material selected from the group consisting of sodium sulphite, sodium sulphate, sodium bisulphate and sodium thiosulphate.

2. The method of thermochemically cutting cast iron containing a percentage of carbon which renders said metal difficult to cut thermochemically, which comprises projecting a stream of cutting-oxygen against the metal to be cut while the metal is at kindling temperature and introducing into the cutting-oxygen stream a flux in powdered form consisting essentially of at least one material selected from the group consisting of sodium sulphite, sodium sulphate, sodium bisulphate, and sodium thiosulphate.

3. The method of thermochemically cutting a ferrous metal selected from the group consisting of alloy steel and cast iron containing a percentage of chromium and carbon, respectively, which render said metal difficult to cut thermochemically, which comprises projecting a stream of cutting-oxygen against the metal to be cut while the metal is at kindling temperature and introducing into the cutting-oxygen stream a flux in powdered form consisting essentially of at least one material selected from the group consisting of sodium sulphite, sodium sulphate, sodium bisulphate, and sodium thiosulphate.

4. The method of thermochemically cutting a ferrous metal selected from the group consisting of alloy steel and cast iron containing a percentage of chromium and carbon, respectively, which render said metals difficult to cut thermochemically, which comprises projecting a stream of cutting-oxygen against the metal to be cut while the metal is at kindling temperature and introducing into the cutting-oxygen stream a flux in powdered form consisting essentially of sodium sulphite.

5. A method of cutting in accordance with claim 4, said sodium sulphite flux being introduced into the cutting-oxygen stream in a proportion of one pound of flux for from 25 to 800 cubic feet of oxygen.

6. A method of cutting in accordance with claim 4, said flux consisting of finely-divided powder all of which will pass a 40 mesh sieve and not more than 10% by weight of which will pass through a 100 mesh sieve.

7. A method of thermochemically cutting stainless steels comprising projecting a stream of cutting-oxygen against a surface portion of a stainless steel body while said surface portion is at or above the kindling temperature, and introducing sodium sulphite into the zone of thermochemical action between said cutting-oxygen stream and said stainless steel body whereby the cutting is effected thermochemically by the combined action of the cutting-oxygen stream and the sodium sulphite.

HAROLD R. FISHER.

REFERENCES CITED

The following references are of record in the file of this patent:

UNITED STATES PATENTS

| Number | Name | Date |
| --- | --- | --- |
| 249,393 | Patten | Nov. 8, 1881 |
| 341,784 | Whitcomb et al. | May 11, 1886 |
| 650,124 | Coleman | May 22, 1900 |
| 750,512 | Wherry | Jan. 26, 1904 |
| 968,350 | Harrison | Aug. 23, 1910 |
| 1,550,280 | Post | Aug. 18, 1925 |
| 2,144,208 | Van Meter | Jan. 17, 1939 |
| 2,321,309 | Miller | June 8, 1943 |
| 2,415,815 | Deming | Feb. 18, 1947 |
| 2,451,422 | Wagner | Oct. 12, 1948 |
| 2,454,325 | Linnert | Nov. 23, 1948 |

FOREIGN PATENTS

| Number | Country | Date |
| --- | --- | --- |
| 568,397 | Great Britain | Apr. 3, 1945 |

OTHER REFERENCES

Mellor: "Comprehensive Treatise on Inorganic and Theoretical Chemistry," vol. 11, 1931, pages 180–182; pub. by Longmans, Green and Co., New York.

Metals Handbook, 1939 edition, pages 930–935; pub. by Amer. Soc. for Metals, Cleveland, Ohio.

Iron Age, vol. 156, August 9, 1945, page 61.

Metals Handbook, 1948 edition, pages 383, 384; pub. by Amer. Soc. for Metals, Cleveland, Ohio.